United States Patent [19]
Shoh

[11] 3,752,380
[45] Aug. 14, 1973

[54] VIBRATORY WELDING APPARATUS
[75] Inventor: Andrew Shoh, Ridgefield, Conn.
[73] Assignee: Branson Instruments, Incorporated, Stamford, Conn.
[22] Filed: Mar. 13, 1972
[21] Appl. No.: 234,198

[52] U.S. Cl............ 228/1, 29/470.3, 156/73, 310/26
[51] Int. Cl............................................. B23k 1/06
[58] Field of Search............ 228/1; 310/26; 29/470.1, 470.3; 156/73, 580

[56] References Cited
UNITED STATES PATENTS
| | | | |
|---|---|---|---|
| 2,891,180 | 6/1959 | Elmore | 29/503 X |
| 3,017,792 | 1/1962 | Elmore et al. | 29/470.1 X |
| 3,051,027 | 8/1962 | Kuris et al. | 29/470.1 X |
| 3,209,447 | 10/1965 | Jones | 29/470 |

Primary Examiner—J. Spencer Overholser
Assistant Examiner—Robert J. Craig
Attorney—Ervin B. Steinberg

[57] ABSTRACT

A vibratory welding apparatus specifically adapted for welding metal includes a resonator one wavelength long at the frequency of the sound transmitted therethrough and is supported from a stationary support by a set of support members which engage the resonator at two of its antinodal regions of longitudinal motion. The members are designed to yield in the direction of resonator motion but to provide rigidity in the direction normal to such motion.

14 Claims, 13 Drawing Figures

Patented Aug. 14, 1973

VIBRATORY WELDING APPARATUS

BRIEF DESCRIPTION OF PRIOR ART

U.S. Pats. Nos. 2,946,119 and 2,946,120 disclose apparatus for welding together workpieces by means of vibratory energy. Specifically, these patents deal wih the sonic or ultrasonic welding of metal workpieces, the weld achieved being in the form of a non-fusion bond. The method and apparatus to accomplish the joining of metal workpieces by means of this method comprise means for holding the workpieces to be joined in intimate contact under a static force and applying to one of the workpieces vibratory energy in a direction substantially perpendicular to the direction of the applied force. The vibratory energy may be in the sonic or in the ultrasonic frequency range. Generally, sonic energy is frequency within the audible range of the human hearing and ultrasonic frequency is vibration above that of human hearing.

The prior art extensively deals with the mounting the vibratory apparatus which provides the energy necessary for accomplishing welding. The vibratory apparatus comprises essentially a length of metal adapted to be resonant at a predetermined frequency, and means coupled to this length of metal to supply the mechanical oscillations for setting the metal into resonance. As is well known, piezoelectric or magnetostrictive transducing means are used for converting applied electrical energy into mechanical vibration, such vibration being then propagated along the length of the metal piece. The entire structure forms a resonator which is suitably dimensioned to operate either as a half wavelength or a full wavelength resonator at the predetermined frequency of sound propagated in the structure, taking into account the material and geometry of the resonating structure, see for instance, "Ultrasonic Engineering" (book) by Julian R. Frederick, published by John Wiley & Sons, Inc., New York, N. Y. (1965) pages 87 to 102.

A typical mounting structure for the resonator frequently used is the so-called "Elmore Mount" as is illustrated in U.S. Pats. Nos. 2,891,178, 2,891,179 and 2,891,180. This type of mount is rather complicated and frequency sensitive and is, therefore, critical as far as its geometric dimensions are concerned. The mount engages the resonator at its nodal region of longitudinal motion, see also U.S. Pat. No. 3,209,447, column 2, lines 64–72, and column 3, lines 1–12.

Recent investigations and tests show that a greatly simplified mount for a resonator of this type can be achieved if the resonator is supported at its antinodal regions. In fact, when supporting the resonator at the antinodal regions very simple and inexpensive sheet metal members adapted to yeild in the direction of vibration of the resonator but providing substantial rigidity in the direction normal to the axis of vibration can be used without significant loss of efficiency. In this manner extremely simple, inexpensive and frequency-insensitive mounting members can be used for supporting the resonator from a fixed supporting structure.

BRIEF SUMMARY OF THE INVENTION

The instant invention describes a resonator primarily adapted for vibratory welding purposes. The resonator is dimensioned to be one wavelength long at the frequency of sound travelling therethrough and is supported from a stationary support by a set of members supporting the resonator at two of its antinodal regions of longitudinal motion. In its simplest embodiment, a pair of sheet metal straps or triangular support members are used, each such member being secured at one end to the stationary support and clamped with its other end to one of the antinodal regions of the resonator. The respective support members are dimensioned to allow a yielding motion in the direction of vibratory motion of the resonator, but to exhibit rigidity in the direction normal to such vibratory motion for precluding motion of the resonator in the direction normal to that of sound travel, i.e. the axis of vibration. A work engaging welding tip is secured to another antinodal region of the resonator and means for engaging workpiece to be welded urge such workpiece into engagement with the tip.

Further and other features of the present invention as well as several embodiments thereof will be more clearly apparent by reference to the following description when taken in conjunction with the accompanying drawing.

DETAILED DESCRIPTION OF THE INVENTION

Figure 1:
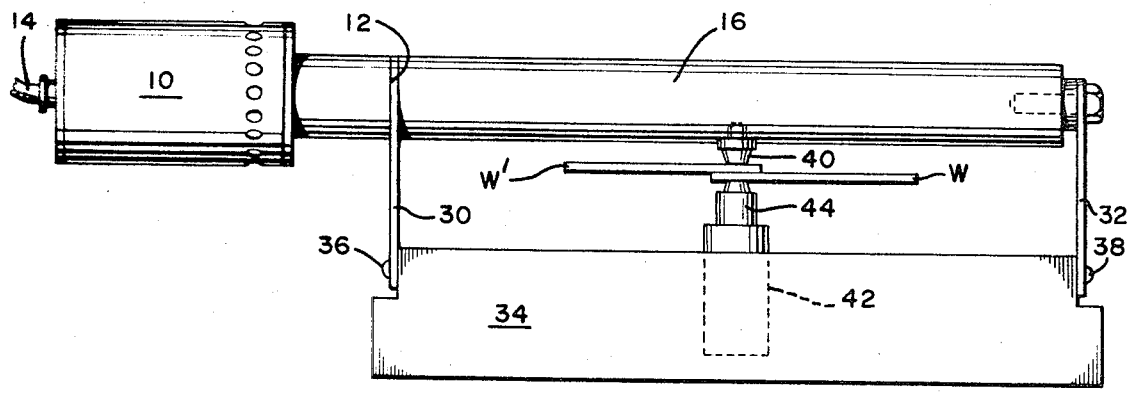
FIG. 1 is an elevational side view of a typical embodiment of the present invention.

Referring now to the figures and FIG. 1 in particular, numeral 10 identifies an electro-acoustic converter unit which is adapted to receive high frequency electrical energy and provide in response to the applied energy vibratory energy at an output surface 12. The converter unit 10 includes most suitably piezoelectric or magnetostrictive means for converting applied electrical energy to mechanical energy. A converter unit suitable for such purpose is described, for instance, in U.S. Pat. No. 3,328,610 entitled "Sonic Wave Generator" issued to S. E. Jacke et al. on June 27, 1967. It will be appreciated by those skilled in the art that other constructions of this type are commercially available and may be used without departing from the scope of the invention. Electrical enegy is applied to the converter unit 10 from an electrical high frequency generator (not shown) via a cable 14. The frequency applied, depending on the particular requirements, may be in the range from a few hundred Hz to 100 kHz, but most suitable is in the range from 1 kHz to 60 kHz.

Figure 2:
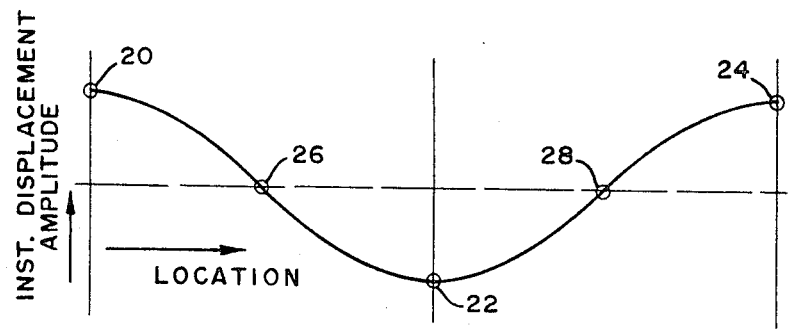
FIG. 2 is a graph showing the instantaneous displacement amplitude vs. location of the resonator.

An elongate bar 16 made for instance of aluminum, titanium, Monel, etc. is mechanically coupled to the output surface 12, and is dimensioned, taking into account the material and geometry thereof, so that at the predetermined frequency supplied by the converter unit 10 the bar will act as a full wavelength resonator for the sound travelling longitudinally therethrough (longitudinal resonator). FIG. 2 shows the instantaneous displacement amplitude of the resonator 16 along its length and as is well understood by those skilled in the art there will exist three antinodal regions of longitudinal motion 20, 22 and 24, and two nodal regions of longitudinal motion 26 and 28.

Referring to FIG. 1, support means in the form of two support members 30 and 32 are mechanically coupled to the resonator 16 at two of its antinodal regions and are secured with their respective other ends to a stationary base or support 34 by means of threaded bolts 36 and 38. The construction of these support members is more clearly evident from the plan views in FIGS. 5 through 8 and will be explained later.

A workpiece engaging tip 40 is screw fastened to the resonator 16 at the remaining antinodal region 22 which is disposed medially between the antinodal regions 20 and 24. The support 34 includes also a force exerting means, such as a hydraulic jack 42 with piston 44, for urging two juxtaposed workpieces W and W' against the workpiece engaging tip 40. Responsive to energizing the converter unit 10 the workpiece engaging tip 40 will vibrate in a direction substantially perpendicular to the direction of the force applied by the piston 44. This action produces a non-fusion weld between both workpieces as described in U.S. Pat. No. 2,946,119 supra.

Figure 4:
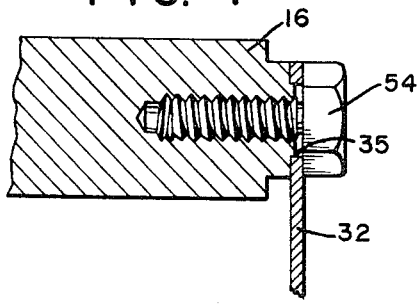
FIG. 4 is a sectional view of a detail of FIG. 1.
Figure 5:
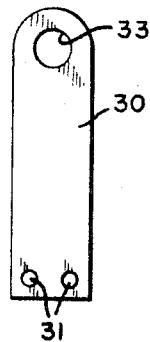
FIG. 5 is a plan view of a typical support means for coupling the resonator to its stationary support.
Figure 6:
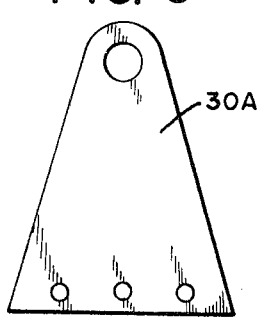
FIG. 6 is a plan view of an alternative design of a support means.
Figure 7:
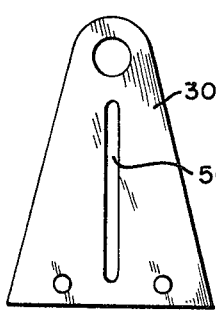
FIG. 7 is a plan view of another alternative embodiment of the support means.
Figure 8:
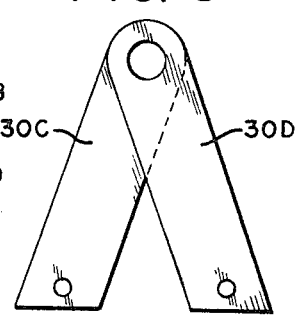
FIG. 8 is a plan view of still another embodiment of the support means.

The principal improvement of the present apparatus comprises the simplicity of the support members 30 and 32 which are designed to yield in the direction of vibration of the resonator but exhibit rigidity in the direction of the force supplied by the cylinder 44. Most suitably, each support member comprises a flat sheet metal member in the form of a strap 30, see FIG. 5, in the form of a triangular sheet metal element 30A FIG. 6, in the form of a triangular sheet metal member 30B having an elongated slot 50, or a pair of straps 30C AND 30D, see FIG. 8. The slot 50 in the embodiment per FIG. 7 provides for greater resiliency of the metal piece 30B. The exemplary embodiments of the support members in FIGS. 5 through 8 can be considered leaf springs which are adapted to yield and bend in the direction of the motion of the resonator 16 thereby permitting the resonator to undergo its expansion and contraction during its resonant state, yet provide rigidity and stiffness in the direction perpendicular to the resonator motion. Each support member is provided with one or more holes 31 to accommodate one or more bolts 36, 38 which secure the respective support members to the support 34. An aperture 33, FIG. 5, is made sufficiently large to clear a threaded internal stud 52 which couples the output end 12 of the converter unit 10 to the input end of the resonator 16. The support member 30, therefore, is tightly clamped in place. Similarly, the other support member 32 is clamped against the other end of the resonator 16 by means of a screw 54 whose head reaching through a suitable aperture 35 clamps the upper end of the support member 32 against the radial end surface of the resonator 16, see FIG. 4. Each respective resonator end is provided with a stepped radial end surface which is dimensioned to engage with is circumference the respective aperture 33, 35 for accurately holding and centering such support member.

It will be appreciated that the support members are extremely simple to manufacture, very inexpensive in their construction, do not have to be adjusted for the particular frequency of the resonator and, last but not least, are secured to the resonator 16 and to the resonator support 34 in a most simple and convenient manner.

Figure 3:
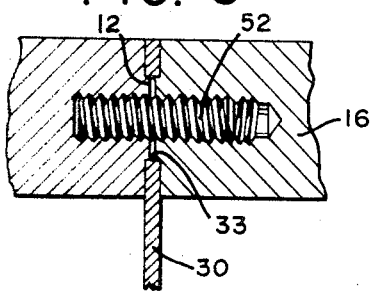
FIG. 3 is a sectional view of a detail of FIG. 1.
Figure 9:
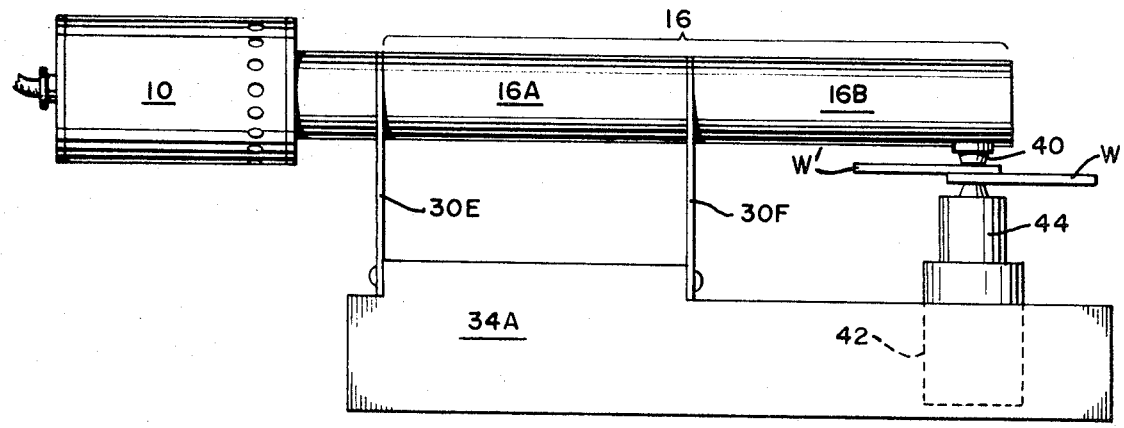
FIG. 9 is a side view of an alternative embodiment of the present invention.

FIG. 9 shows a slight modification of the arrangement shown in FIG. 1. The resonator 16, FIG. 9, comprises two half wavelength resonators 16A and 16B which when joined by a threaded stud as shown in FIG. 3 provide a full wavelength resonator, same as in FIG. 1. Two support members 30E and 30F are mounted to the support 34A at two proximate antinodal regions 20 and 22, see FIG. 2, while the workpiece engaging tip 40 is disposed at the remaining antinodal region 24. This construction is advantageous for better accessability when the workpiece has a long overhang and the distance spanned between the antinodal regions 20 and 24 (determined by the frequency, material and geometry of the resonator) would be insufficient.

Figure 10:
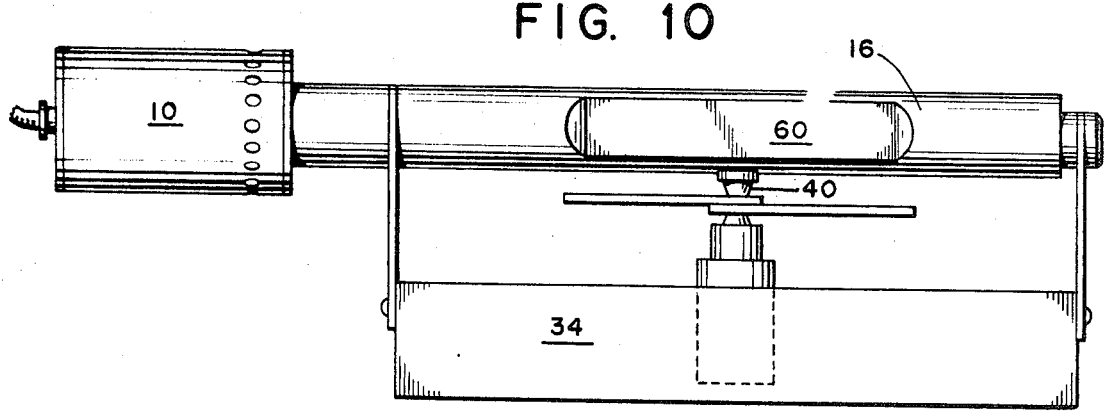
FIG. 10 is a side view, same as FIG. 1, but showing a modification.

A variation of the resonator design is shown in FIG. 10. The resonator 16 is provided with a reduced cross-sectional area 60 in the area of the workpiece engaging tip 40 for increasing the amplitude of vibration of the tip 40. As is well known, see J. R. Frederick supra, the amplitude of vibration of a resonator can be increased by reducing the cross-sectional area.

Figure 11:
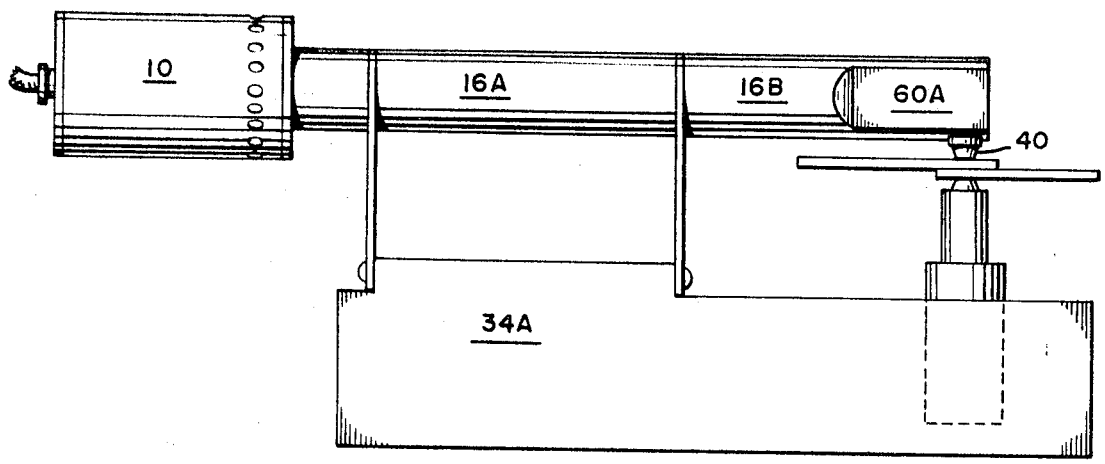
FIG. 11 is a side view, same as FIG. 9, showing a modification.

A similar increase of vibrational amplitude can be achieved in the embodiment per FIG. 9 by reducing the cross-sectional area of the resonator at its output surface as is indicated by numeral 60A in FIG. 11. The reduction in cross-sectional area is accomplished in such a way as to least decrease the strength of the resonator in the direction of the applied static force which urges the workpiece against the workpiece engaging tip 40.

Figure 12:
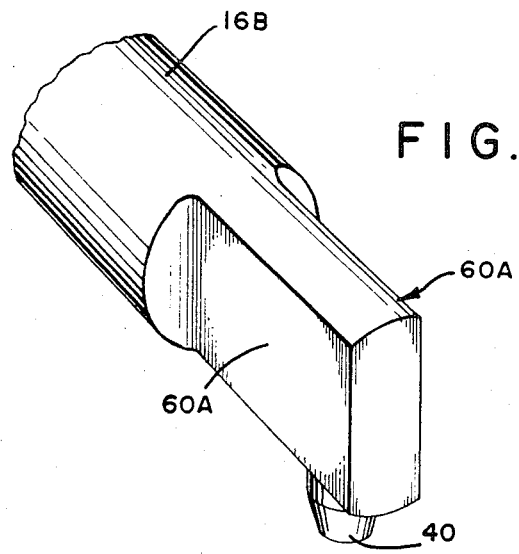
FIG. 12 is a perspective view of a portion of the resonator shown in FIG. 11.

FIG. 12 is an enlarged perspective view of the work performing portion of the resonator shown in FIG. 11. The reduction in cross-sectional area suitably is accomplished in or near the nodal region, see for instance U.S. Pat. No. Re. 25,033 issued to L. Balamuth et al. dated Aug. 29, 1961.

Figure 13:
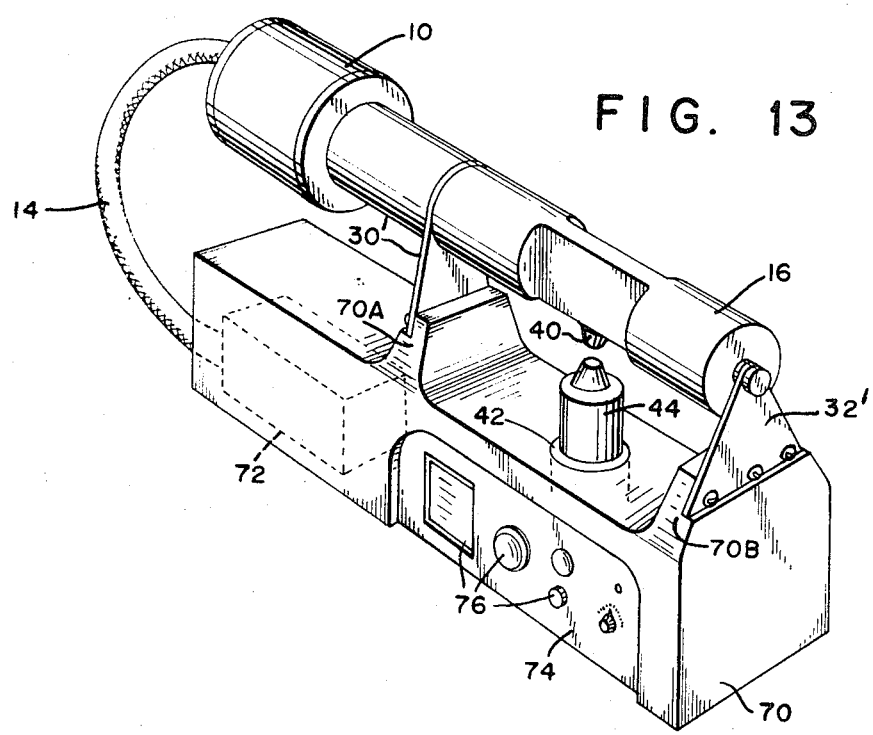
FIG. 13 is a perspective view illustrating a typical vibratory welding apparatus which includes the resonator, support, power supply casing, and controls.

A complete vibratory welding apparatus is illustrated in FIG. 13, the stationary support 70 contains in its base the electrical high frequency generator 72 which converts the applied electrical energy at power line voltage and frequency to high frequency, for example 20 kHz. The power cable 14 connects the high frequency generator 72 to the converter unit 10 which is mechanically coupled to the resonator 16, causing the resonator to exhibit three antinodal regions 20, 22 and 24 as described heretofore. A pair of support members 30' and 32' are screw fastened to raised bosses 70A and 70B of the support 70 and are coupled to the resonator 16 at two of its antinodal regions 20 and 24 by being clamped against the radial end surfaces, see FIGS. 3 and 4. A workpiece engaging tip 40 is disposed at the remaining antinodal region 22 and is opposed by a force providing means 42, 44 for urging a workpiece against the tip 40. The base of the support 70 includes also a panel 74 which includes various controls 76 for adjusting the pressure supplied by the force means 42, 44, for adjusting the vibratory energy apparent at the workpiece engaging tip 40, for selecting the time during which the resonator is vibrated, for adjusting the dwell time, if any, after the cessation of vibratory energy, and such other controls as are required for a cycle of operation. It will be apparent that the force providing means 42, 44 aside from hydraulic or pneumatic means indicated may comprise also mechanical camming means.

Instead of using a separate converter unit 10, it is readily possible to incorporate piezoelectric transducing disks directly in the one wavelength resonator 16, thereby shortening the apparatus by one-half wavelength, i.e. the length of the active structure contained within the housing of the converter unit. The placement of piezoelectric transducer disks within a one-half wavelength resonating structure for obtaining maximum efficiency is shown in U.S. Pat. No. 3,524,085 to A. Shoh entitled "Sonic Transducer" dated Aug. 11, 1970.

The workpiece engaging tip 40 being screw fastened to the resonator 16 is adapted to be replaced if wear occurs. It has been found advantageous to serrate or knurl the workpiece engaging surface of the tip in order to achieve a high degree of energy coupling.

It will be apparent that the heretofore described construction of a vibratory welding apparatus is characterized by extreme simplicity and by virtue of such great simplification constitutes a major improvement and advance in the art.

What is claimed is:

1. A vibratory welding apparatus comprising:
   an elongate resonator dimensioned to be at least one wavelength long at a predetermined frequency of sound travelling therethrough, said resonator exhibiting when resonant three antinodal regions of longitudinal motion;
   a workpiece engaging tip adapted to engage a workpiece disposed at one of said antinodal regions of said resonator;
   a support;
   support means disposed for coupling said resonator at said other antinodal regions to said support, said support means being of a configuration to provide for limited yielding motion in the direction of sound travelling through said resonator to enable said resonator to be resonant but to substantially preclude motion of said resonator in the direction normal to that of said sound travel, and
   means providing a force for urging said workpiece into contact with said tip, such force being substantially in a direction normal to that of said sound travel.

2. A vibratory welding apparatus as set forth in claim 1 and means coupled to said resonator for generating vibration of said predetermined frequency.

3. A vibratory welding apparatus as set forth in claim 2, said support means for coupling said resonator to said support comprising at each of said other antinodal regions a substantially flat member engaging with one end thereof said resonator and the other end of each member engaging said support, each of said members adapted to flex responsive to the vibration exhibited by said resonator at said antinodal regions, but providing rigidity in the direction in which said force is applied.

4. A vibratory welding apparatus as set forth in claim 3, said members comprising a metallic strap.

5. A vibratory welding apparatus as set forth in claim 3, said members comprising a generally triangular sheet metal member.

6. A vibratory welding apparatus as set forth in claim 2, said workpiece engaging tip being removably attached to said resonator and extending from said resonator along an axis which is substantially normal to the major axis of said resonator.

7. A vibratory welding apparatus as set forth in claim 2, said means providing a force being mounted to said support and including a movable means adapted to engage one side of a workpiece for urging the other side of the workpiece against said tip.

8. A vibratory welding apparatus as set forth in claim 2, said other antinodal regions being proximate antinodal regions.

9. A vibratory welding apparatus as set forth in claim 2, said other antinodal regions straddling said one antinodal region.

10. A vibratory welding apparatus as set forth in claim 2, said support being stationary.

11. A vibratory welding apparatus as set forth in claim 10, said means providing a force including a reciprocating force exerting member.

12. A vibratory welding apparatus comprising;
    an elongate metal member dimensioned to be at least one wavelength long at a predetermined frequency of sound travelling therethrough and thereby forming a longitudinal resonator;
    transducing means coupled to said member for causing said member to be resonant at said predetermined frequency in response to electrical energy applied to said transducing means and said member when resonant exhibiting three antinodal regions of longitudinal motion;
    a workpiece engaging tip adapted to engage a workpiece disposed on said member at one of said antinodal regions and extending therefrom substantially perpendicular to the axis of sound travelling through said member;
    a stationary support;
    a pair of support means, one disposed at each of said other antinodal regions for coupling said member to said support and retaining said member distanced from said support, each support means comprising a flat sheet metal leaf member secured with one end to said elongate member and with the other end to said support, and each leaf member being dimensioned to yield in the direction of the vibration of said elongate member but to substantially preclude motion of said elongate member in the direction perpendicular to such vibration, and
    means disposed for providing a force for urging said workpiece in contact with said tip.

13. A vibratory welding apparatus as set forth in claim 12, each of said sheet metal leaf members having an aperture for receiving therein a screw means engaging said elongate member for causing said leaf members to be coupled to said elongate member by being clamped against a respective radial surface of said elongate member.

14. A vibratory welding apparatus comprising:
    an elongate member including as a part thereof electroacoustic converting means, said member dimensioned to be resonant at a predetermined frequency of sound travelling longitudinally therethrough in response to said converting means being energized with electrical energy of said frequency and when rendered resonant exhibiting three antinodal regions of longitudinal motion;

a support;

a pair of support means, each of said support means coupled with one of its ends to said member at a respective antinodal region thereof and coupled with its other end to said support, and each support means comprising a leaf spring member dimensioned to yield in the direction of vibration of said elongate member when the latter is resonant but to substantially preclude motion of said elongate member relative said support in the direction perpendicular to such vibration;

a workpiece engaging tip adapted to engage a workpiece disposed on said elongate member at said remaining antinodal region and extending therefrom substantially perpendicular to the axis of sound travelling through said member, and means disposed for providing an engagement force between said tip and said workpiece.

* * * * *